(No Model.)
A. H. HOYT.
GALVANOMETER.
No. 532,561. Patented Jan. 15, 1895.
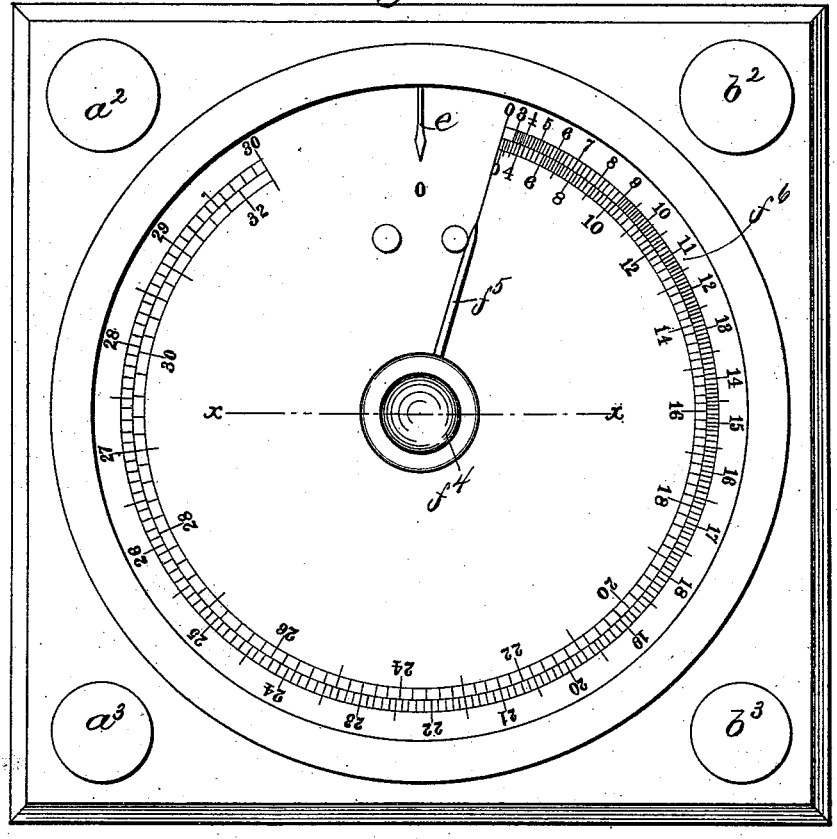
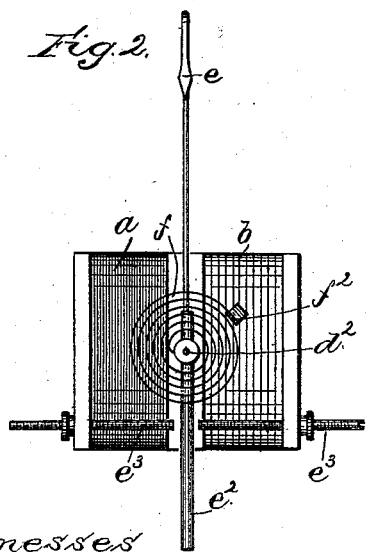
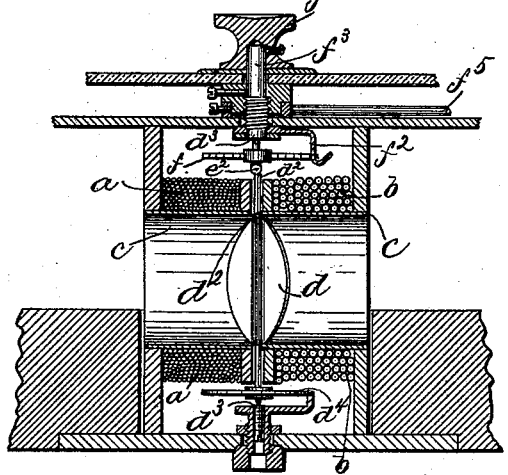
Witnesses
Jas. J. Maloney
J. H. Livermore
Inventor,
Adrian H. Hoyt,
by Jos. P. Livermore
Atty.

UNITED STATES PATENT OFFICE.

ADRIAN H. HOYT, OF PENACOOK, NEW HAMPSHIRE, ASSIGNOR TO THE WHITNEY ELECTRICAL INSTRUMENT COMPANY, OF SACO, MAINE, AND MANCHESTER, NEW HAMPSHIRE.

GALVANOMETER.

SPECIFICATION forming part of Letters Patent No. 532,561, dated January 15, 1895.

Application filed April 25, 1894. Serial No. 508,932. (No model.)

*To all whom it may concern:*

Be it known that I, ADRIAN H. HOYT, of Penacook, county of Merrimac, State of New Hampshire, have invented an Improvement in Galvanometers, of which the following description, in connection with the accompanying drawings, is a specification, like letters on the drawings representing like parts.

My invention relates to electrical indicating devices or galvanometers, and is particularly adapted to that class of instruments known as ammeters or voltmeters, such instruments being used to indicate in units of electrical measurement, the amount of current flowing in a circuit at any given moment.

The operation of the instrument is due to the attractive influence of a magnetic field upon a body of magnetic material which may be termed an armature or needle, which tends to draw such armature into the strongest part of the field.

The present invention consists in improvements in the arrangement of the armature with relation to the coil or coils which are adapted to be energized by the current to be indicated or measured, its object being to provide an instrument capable of use with direct or alternating currents, the said instrument being so arranged that the scale thereof may be calibrated to the best possible advantage.

The invention also comprises means for measuring currents of comparatively high or comparatively low voltage by means of separate coils of comparatively high and comparatively low conductivity, respectively, the armature being so arranged that it will respond to currents in either of said coils which may be connected to the circuit the current flowing through which is to be observed. In order to accomplish these ends, an armature consisting of a thin plate of soft iron normally neutral or non-polarized is pivotally supported on an axis parallel to its own plane at a point adjacent to the mouth of the coil or solenoid adapted to be connected to a circuit carrying electric currents, the said axis being also perpendicular to the axis of the coil. The said armature is set at such an angle that one of its extremities, taking its axis as the center, extends into the mouth of the coil but at an angle to the axis thereof. When therefore a current is passed through the said coil the magnetic effect thereof is to attract the said extremity of the armature which then becomes a polar extremity and to draw the same toward the center of the coil there being at the same time the well known tendency of the armature or needle to take up a position with its polar extremities at right angles to the direction of the wire in the coil and consequently parallel to the axis thereof. Thus when the coil becomes energized the armature is turned by the force above described and the effect of the said force in turning the said armature will be greater or less according to the amount of current flowing in the coil. Thus the amount of current may be indicated by ascertaining through suitable means the amount of force required to resist the movement of the armature when thus turned and the result may be indicated upon a suitable scale calibrated in units of electrical current. This may be accomplished in any suitable way but preferably by opposing to the movement of said armature a variable force as that of a spring and providing a manual actuator adapted to vary the said opposing force such for example as a shaft capable of being turned by a knob and connected to one end of a spring, the other end of which is connected to the armature spindle or axis, and providing means for indicating in electrical units the extent to which said force is varied, which may be accomplished by connecting to the actuator a pointer adapted to travel over a suitable calibrated scale. When this arrangement is used a second pointer is also provided to indicate the position of the armature so that the observer can see when the opposing force is just sufficient to balance the effect of current, the position of the pointer attached to the actuator then showing the amount of current in the coil.

In order that currents of different voltage or ampèrage may be indicated by the same instrument a second coil may be provided and so placed that the opposite end of the armature extends into the mouth thereof the armature thus being symmetrically arranged with relation to both coils and capable of responding to a current in either.

The invention also consists in certain details of construction more fully described hereinafter.

The instrument embodying my invention consists of two coils, or soleonids, of insulated wire or ribbon, which may be wound on the same supporting shell or spool and placed end to end, each of said coils being provided with circuit connections of its own. Between the said coils is pivoted a needle or armature, normally standing at an angle to the axis of the coils said armature thus being in independent proximity to both coils. One of the said coils is adapted to take currents of high voltage, while the other is intended for currents of voltage comparatively low. A pointer carried by said armature indicates by its deflection from the point at which it rests when the armature is in its neutral position, that a current is flowing through one of the coils. In order to determine the amount of such current I apply an opposing force which can be increased or diminished; such for example, as a spiral spring one end of which is fastened to the armature and the other to a suitable straining device such as a spindle or drum. This straining device is provided with a knob or handle, and carries a pointer which travels over a suitable scale. The instrument is then electrically connected to the circuit on which observations are to be made, and the current flowing through the solenoid deflects the needle, after which the operator or observer turns the knob carrying the straining device and pointer, thus increasing the force opposing the attractive force acting on the needle until the latter is brought to its predetermined zero position, indicating a balance between the inductive effect of the current and the opposing force. The position of the pointer upon a suitable calibrated scale indicates the amount of current.

Figure 1 is a plan view of the face of the instrument. Fig. 2 is a detail showing the coil and pointer, as seen with the dial removed, and Fig. 3 is a vertical cross-section on line $x, x$, of Fig. 1.

Referring to Fig. 3, the coils $a$ and $b$ are wound side by side upon a hollow supporting shell or spool $c$, each of said coils having separate circuit connections, through the binding posts $a^2$, $a^3$, and $b^2$, $b^3$, respectively, Fig. 1. Within the said core and between the said coils stands a needle or armature $d$, mounted on an arbor or spindle $d^2$ perpendicular to the axis of the core and free to turn in bearings $d^3$ at the top and bottom of the instrument. The said armature is preferably in the shape of a disk, and normally stands, as shown, at a slight angle to the plane of the coils, or nearly transverse to the axis thereof, so that its ends or edges are just within the mouths of the coils respectively. It is normally retained in this position by a coil spring $d^4$ of just sufficient strength to hold it in place without substantially opposing its movement when influenced by the inductive effect of a current flowing through either coil. Radially attached to the spindle $d^2$ is a pointer $e$, Figs. 1 and 2, having an extension or counterpoise $e^2$ limited in its movement by two stops $e^3$. The said pointer is so adjusted with relation to the armature and face of the instrument, that when the said armature is in its normal position as shown in Fig. 3, it points to a "0" or other suitable mark upon the face of the instrument (Fig. 1). If, then, a current of electricity be passed through either coil, the effect will be to attract the armature $d$ with a tendency to turn it to the position with the plane of the armature in line with the axis of the energized coil, and thus to deflect the pointer $e$ until the latter is engaged by one of the stops $e^3$ the end of the needle leaving the "0" mark and indicating the presence of a current. In order to determine the amount of current a second spring $f$ is connected at one end to the spindle $d^2$ and at the other end to an arm $f^2$ radially attached to an arbor $f^3$ provided with a knob or handle $f^4$ by which it can be turned, thus tightening the spring and increasing the force exerted thereby.

The pointer $f^5$ carried by the arbor $f^3$ travels over a scale $f^6$ upon the face of the instrument, the said scale being calibrated in terms of electrical measurement.

The operation of the device is as follows:—When an electric current flows through either the coil $a$ or the coil $b$ the armature $d$ under the inductive effect of the coil is drawn into the mouth thereof and thus turned upon its axis $d^2$ deflecting the pointer $e$. The operator or observer then turns the knob $f^4$ causing the pointer $f^5$ to travel over the scale $f^6$ and at the same time increasing the tension of the coil spring $f$, until the force exerted by said spring becomes sufficiently great to balance the inductive effect of the current upon the armature and bring it to its zero or starting position. When the pointer $e$ is thus brought by adjustment of the spring to the zero position the position of the pointer $f^5$ upon the scale $f^6$ indicates the amount of current in the circuit.

It is to be understood that the coils $a$ and $b$ are not co-operative in function but are provided in order that the same instrument may be used on different circuits widely varying in the amount of current carried. If for example, a circuit carrying currents of comparatively low voltage is to be connected to the instrument, the coil $a$ which is of finer wire and of less conductivity than the coil $b$ would be used. If on the other hand, circuits carrying currents of a comparatively high voltage were to be connected with the instrument, the coil $b$ would be used, such coil being composed of wire of sufficiently high conductivity to take currents of high voltage without injury. By this arrangement of coils I am enabled to use the same instrument on a greater variety of circuits without essentially complicating or multiplying the parts thereof since the armature $d$ will respond to one coil as well as to the other. The scale $f^6$ may be provided as shown with a double set of graduations, one for use if one of said coils is in circuit, and the other for use with the other coil. As shown in this instance, the armature $d$ is normally non-polarized and made of material capable of being magnetized and demagnetized, such for example as soft iron, so that the polarity thereof will change as the direction of current changes, and it will therefore respond to an alternating current as well as to a direct current.

I do not intend to limit myself to the exact construction herein set forth since modifications might obviously be made without departing from the spirit of the invention, which consists broadly in measuring the amount of the current by means of a variable opposing force capable of being adjusted by the operator until the magnetic effect of the current upon a needle or armature at a predetermined position with relation to the magnetic field induced by such current, is balanced and the amount of current thus indicated.

The invention also consists in the use of two separate coils and a common armature or needle so situated as to be acted upon by either coil and while it is preferable to place the coils end to end as shown, the same result might be obtained without adhering strictly to this specific arrangement.

I claim—

1. An electrical indicating device comprising a coil or solenoid, an armature or needle pivotally supported across the mouth of said solenoid on an axis perpendicular to the axis thereof; means for holding said armature normally in such position that one of its extremities extends into the mouth of the said coil but at an angle to the axis thereof; a variable force opposed to the movement of said armature upon its axis, and means for determining the amount of such force required to balance the inductive force tending to move the said armature from the said neutral position as described.

2. An electrical indicating device comprising a coil, an armature or needle consisting of a disk of soft iron pivotally supported on an axis parallel to its own plane and perpendicular to that of the coil, the said armature extending across the mouth of the coil and having one of its extremities projecting into the mouth of said coil; a force opposed to the movement of said armature; means for adjusting effect of said force to balance the force exerted by the current upon the armature at a predetermined position, and an indicator co-operating with the said adjusting means, substantially as described.

3. An electrical indicating device comprising two solenoids, a common armature pivoted at right angles to the axis of said coils, the polar extremities thereof extending into the mouths of said coils respectively, and means for indicating the amount of current in either solenoid by the inductive effect thereof on said armature, as set forth.

4. An electrical indicating apparatus comprising two solenoids placed end to end, an armature between the two movable on an axis perpendicular to their common axis, and having its polar extremities extending into the mouths of said coils respectively, means for indicating the amount of current in either solenoid by the inductive effect thereof upon said armature and separate circuit connections for said coils, respectively, as set forth.

In testimony whereof I have signed my name to this specification in the presence of two subscribing witnesses.

ADRIAN H. HOYT.

Witnesses:
J. ALBERT MASSIE,
HORACE D. BEAN.